(12) United States Patent
Fukudome et al.

(10) Patent No.: US 9,114,538 B2
(45) Date of Patent: Aug. 25, 2015

(54) PARALLEL LINK ROBOT AND PICKING SYSTEM

(75) Inventors: Kazuhiro Fukudome, Kitakyushu (JP); Takashi Sanada, Kitakyushu (JP); Nobuhiko Mihara, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 190 days.

(21) Appl. No.: 13/542,670

(22) Filed: Jul. 6, 2012

(65) Prior Publication Data
US 2013/0017050 A1 Jan. 17, 2013

(30) Foreign Application Priority Data
Jul. 15, 2011 (JP) ................. 2011-156859

(51) Int. Cl.
B25J 9/00 (2006.01)
B25J 17/02 (2006.01)
B25J 19/00 (2006.01)

(52) U.S. Cl.
CPC ............ *B25J 17/0266* (2013.01); *B25J 9/0018* (2013.01); *B25J 19/0075* (2013.01); *Y10T 74/20305* (2015.01); *Y10T 74/20317* (2015.01)

(58) Field of Classification Search
CPC .... B25J 9/0018; B25J 9/0093; B25J 17/0266; B25J 19/0075; B25J 11/0045; B25J 15/0616; B65G 47/90
USPC ................. 74/490.03, 490.1, 493; 414/222.07
See application file for complete search history.

(56) References Cited

U.S. PATENT DOCUMENTS

| | | |
|---|---|---|
| 5,333,514 A | 8/1994 | Toyama et al. |
| 2006/0207500 A1* | 9/2006 | Herre .............................. 118/323 |
| 2008/0223165 A1 | 9/2008 | Helmer et al. |
| 2010/0060015 A1* | 3/2010 | Buker ........................... 290/1 R |
| 2010/0206120 A1* | 8/2010 | Kinoshita et al. ........... 74/490.06 |
| 2011/0150609 A1* | 6/2011 | Ford et al. ................. 414/222.07 |

FOREIGN PATENT DOCUMENTS

| | | |
|---|---|---|
| EP | 1938929 | 7/2008 |
| JP | 2008-264881 | 11/2008 |
| JP | 2009-255197 | 11/2009 |
| WO | WO 00/29177 | 5/2000 |

OTHER PUBLICATIONS

Japanese Office Action for corresponding JP Application No. 2011-156859, Jul. 30, 2013.
Extended European Search Report for corresponding EP Application No. 12176307.2-1712, May 15, 2013.

(Continued)

*Primary Examiner* — Saul Rodriguez
*Assistant Examiner* — Ronald Jarrett
(74) *Attorney, Agent, or Firm* — Mori & Ward, LLP (57) ABSTRACT

A parallel link robot includes a housing, a plurality of driving devices, and a plurality of arms. The housing includes arm coupling openings and a receiving opening. The plurality of driving devices are disposed in the receiving opening of the housing. The plurality of driving devices are attachable and detachable from and in a direction above the receiving opening. The plurality of arms are coupled to the respective driving devices through the respective arm coupling openings.

23 Claims, 7 Drawing Sheets (56) References Cited

OTHER PUBLICATIONS

Chinese Office Action for corresponding CN Application No. 201210244171.X, May 5, 2014.

Chinese Office Action for corresponding CN Application No. 201210244171.X, Nov. 17, 2014.

Chinese Office Action for corresponding CN Application No. 201210244171.X, Apr. 17, 2015.

* cited by examiner

PARALLEL LINK ROBOT AND PICKING SYSTEM

CROSS-REFERENCE TO RELATED APPLICATIONS

The present application claims priority under 35 U.S.C. §119 to Japanese Patent Application No. 2011-156859, filed Jul. 15, 2011. The contents of this application are incorporated herein by reference in their entirety.

BACKGROUND OF THE INVENTION

1. Field of the Invention

The present invention relates to a parallel link robot and a picking system.

2. Discussion of the Background

Conventional parallel link robots include parallel link mechanisms. A parallel link mechanism refers to a mechanism that includes a plurality of arms coupled in parallel to each other and a single distal end supported by the plurality of arms. A parallel link robot controls the distal end by the sum of the forces of the plurality of arms. This makes parallel link robots superior in speed and accuracy to general industrial robots such as serial link robots.

For example, Japanese Unexamined Patent Application Publication No. 2008-264881 discloses a parallel link robot that includes three arms.

SUMMARY OF THE INVENTION

According to one aspect of the present invention, a parallel link robot includes a housing, a plurality of driving devices, and a plurality of arms. The housing includes arm coupling openings and a receiving opening. The plurality of driving devices are disposed in the receiving opening of the housing. The driving devices are attachable and detachable from and in a direction above the receiving opening. The plurality of arms are coupled to the respective driving devices through the respective arm coupling openings.

According to another aspect of the present invention, a picking system includes a robotic cell and a parallel link robot. The robotic cell includes a ceiling including an opening. The parallel link robot is disposed on the ceiling of the robotic cell to cover the opening of the ceiling. The parallel link robot includes a housing, a plurality of driving devices, and a plurality of arms. The housing includes arm coupling openings and a receiving opening. The plurality of driving devices are disposed in the receiving opening of the housing. The plurality of driving devices are attachable and detachable from and in a direction above the receiving opening through the opening of the ceiling. The plurality of arms are coupled to the respective driving devices through the respective arm coupling openings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

In one embodiment, a parallel link robot is applied to a picking system that captures workpieces carried on a conveyor and moves the workpieces to another position. In this embodiment, the workpieces carried on the conveyor are hygiene sensitive products such as food products and pharmaceutical products. This embodiment, however, is for illustrative purposes only and should not be construed as limiting the present invention.

Embodiments

Figure 1:
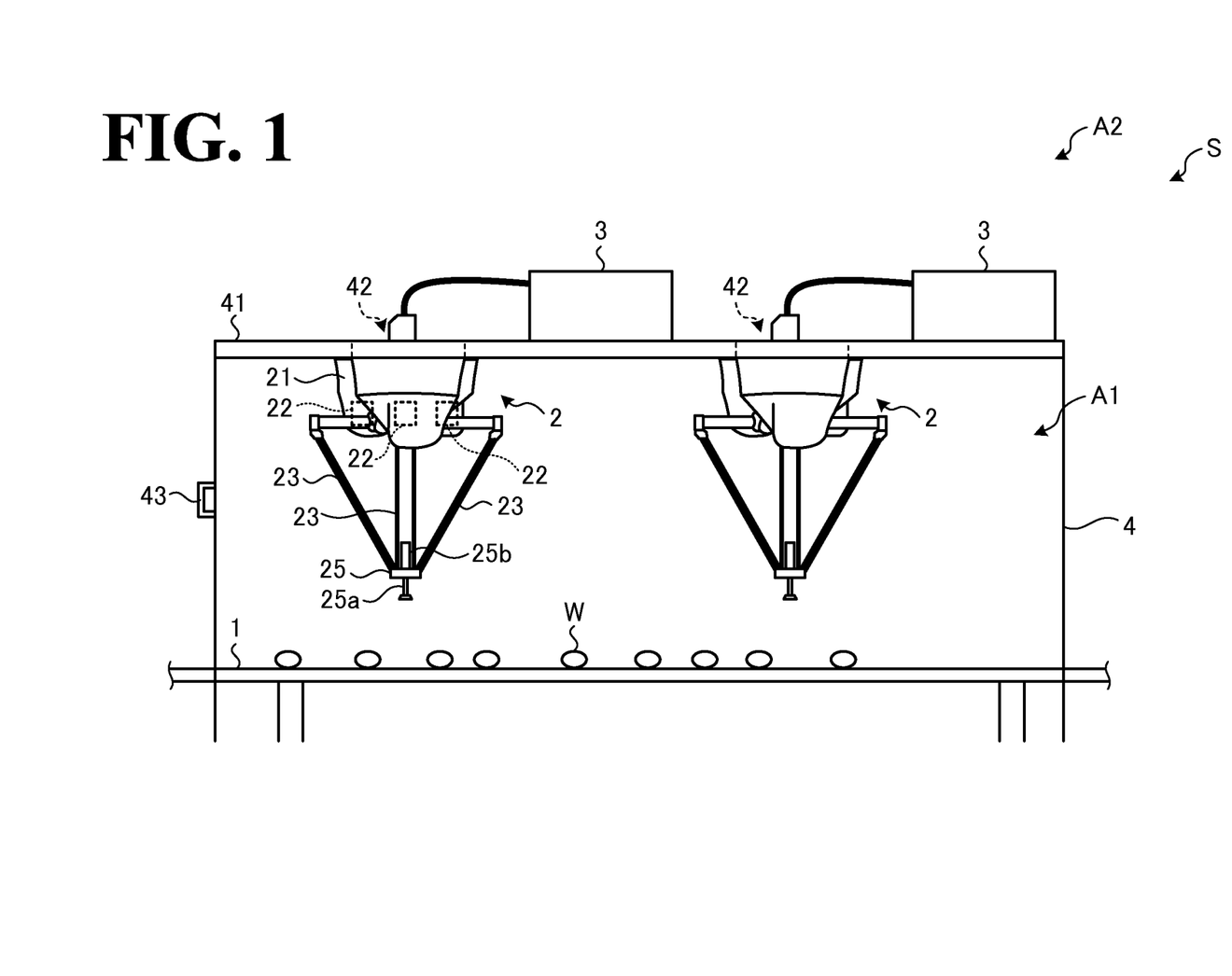
FIG. 1 is a diagram illustrating a picking system according to an embodiment.

First, a picking system according to this embodiment will be described by referring to FIG. 1. FIG. 1 is a schematic view of the picking system according to this embodiment.

As shown in FIG. 1, a picking system S according to this embodiment includes a conveyor 1, two parallel link robots 2, a controller 3, and a robotic cell 4.

The conveyor 1 is a conveying unit that conveys workpieces W from upstream to downstream. While in this embodiment the conveyor 1 is a belt conveyor, this should not be construed in a limiting sense; the conveyor 1 may be another kind of conveying unit such as a roller conveyor and a chain conveyor.

Each of the parallel link robots 2 includes a parallel link mechanism. Each parallel link robot 2 executes capture operations and transferring operations of workpieces W in accordance with instructions from the controller 3. The parallel link robot 2 includes three arms 23 coupled in parallel to each other to support a movable portion 25. Each of the three arms 23 is independently driven by its corresponding one of three motor units 22 accommodated in a housing 21.

The movable portion 25 includes an end effector 25a and a motor unit 25b. The end effector 25a is, for example, a suction pad that captures workpieces W utilizing suction force effected by a suction device such as a suction pump. The motor unit 25b is a driving device that rotates the end effector 25a.

In accordance with an instruction from the controller 3, the parallel link robot 2 drives the motor unit 22 in the housing 21 and drives the motor unit 25b at the movable portion 25. This causes the end effector 25a to move to the workpiece W to be captured and then to capture the workpiece W.

The controller 3 controls the operation of the parallel link robot 2. Specifically, the controller 3 obtains an overhead image of the conveyor 1 from a camera, not shown, disposed above the conveyor 1 and detects the workpiece W by referring to the obtained image. The controller 3 then instructs the parallel link robot 2 to capture the workpiece W based on the detection result.

The robotic cell 4 has an approximately rectangular parallelepiped shape enclosing the parallel link robots 2 for safety purposes, such as to prevent an operator from physically contacting the parallel link robots 2 in motion. The robotic cell 4 includes, on its side surfaces, transparent members of polycarbonate or like material to ensure visual identification of the parallel link robots 2 operating in the robotic cell 4. A door with a handle 43 is disposed on one side surface of the robotic cell 4. The door provides access to the parallel link robots 2 inside the robotic cell 4, specifically by pulling the handle 43 to open the door.

The robotic cell 4 is covered on top with a ceiling 41 of metal material such as a steel plate. To the undersurface of the ceiling 41, the parallel link robots 2 are secured. Thus, the parallel link robots 2 capture the workpieces W from above the conveyor 1.

The ceiling 41 may be the ceiling of the plant itself where the picking system S is disposed.

The space below the ceiling 41, that is, the region defined by the robotic cell 4 is a workspace A1 where the conveyor 1 and the parallel link robot 2 are disposed. The workspace A1 is a hygiene sensitive space in which to handle food or pharmaceutical workpieces W.

In view of this, the parallel link robots 2 need to ensure a minimal possibility of causing unhygiene conditions such as the conveyor going unclean due to foreign matters including bolts, grease, and dusts that have dropped onto the conveyor during maintenance.

Even if there is some possibility of foreign matters dropping onto the conveyor during maintenance, it is contemplated to use a sheet or like material to cover the conveyor during maintenance, in an attempt to ensure hygiene of the workspace. This, however, involves additional work of placing and removing the sheet, which can elongate the working time and bring the maintenance work into complication.

In view of this, the picking system S according to this embodiment provides a maintenance space A2 of the parallel link robots 2 at a place isolated while the operator staying in the workspace A1. Specifically, the maintenance space A2 is above the ceiling 41. The parallel link robots 2 are configured in a manner that permits their maintenance in the maintenance space A2. This ensures hygiene during maintenance.

Specifically, the ceiling 41 includes predetermined openings 42. The housing 21 of each parallel link robot 2 is open on top so that the motor units 22 and other elements accommodated inside the housing 21 are attachable and detachable from and in a direction above the housing 21.

Each parallel link robot 2 is mounted on the ceiling 41 with the opening of the housing 21 aligned with the corresponding opening 42 of the ceiling 41. This ensures that the motor units 22 and other elements accommodated in the housing 21 undergo maintenance including replacement, repair, and inspection while the operator staying in the maintenance space A2.

The use of the maintenance space A2 isolated while the operator staying in the workspace A1 for maintenance of the parallel link robots 2 minimizes the possibility of dropping of foreign matters such as bolts, grease, and dusts onto the conveyor 1. This ensures facilitated maintenance with hygiene without the additional work of placing and removing the sheet.

As shown in FIG. 1, the controller 3 is preferably disposed in the maintenance space A2. This eliminates the need for a space for the controller 3 in the workspace A1, saving the space of the picking system S.

Figure 2A:
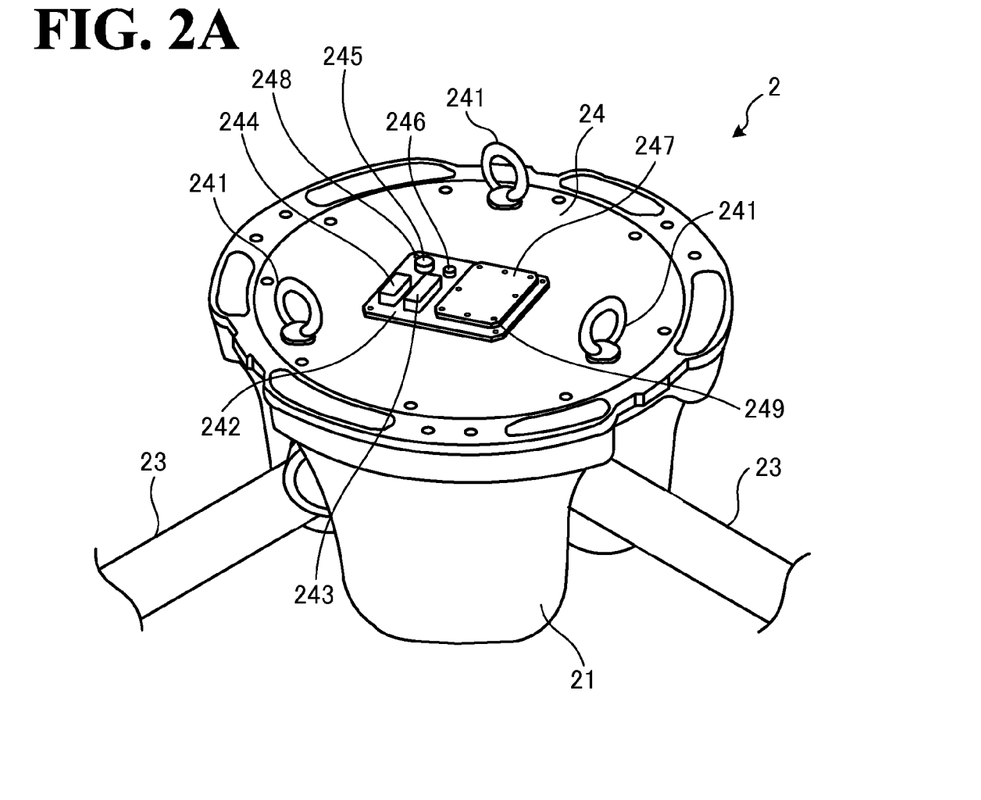
FIG. 2A is a schematic perspective view of a parallel link robot according to the embodiment.

Next, the configuration of the parallel link robot 2 according to this embodiment will be described in detail. FIG. 2A is a schematic perspective view of the parallel link robot 2 according to this embodiment.

As shown in FIG. 2A, the parallel link robot 2 includes the housing 21, the arms 23, and a lid 24. As described above by referring to FIG. 1, the parallel link robot 2 also includes the motor units 22 and the movable portion 25.

The housing 21 is in the form of a cover body with a bottom and accommodates the motor units 22. The housing 21 includes three openings 211 at positions higher than the bottom of the housing 21. Through the openings 211, the respective arms 23 are passed inside the housing 21. The configuration of the housing 21 will be described in detail later by referring to FIG. 3.

Each motor unit 22 is a driving device to drive its corresponding arm 23 and is accommodated in the housing 21, as shown in FIG. 1. For the purpose of facilitating maintenance, the motor unit 22 according to this embodiment is a reducer equipped motor unit integrally including a motor and a reducer. The configuration of the motor unit 22 will be described later by referring to FIG. 4.

Each arm 23 is made of a lightweight material such as aluminum casting. The arm 23 has a base end coupled to its corresponding motor unit 22 inside the housing 21 through the opening 211. As described above by referring to FIG. 1, the distal end of the arm 23 is coupled to its corresponding movable portion 25. Thus, the arms 23 are coupled in parallel to each other. A method for mounting the motor unit 22 and the arm 23 on the housing 21 will be described later by referring to FIG. 4.

The lid 24 covers the opening at the top of the housing 21. The lid 24 includes ring hooks 241 on the top surface. The hooks 241 are used to mount the parallel link robot 2 onto the ceiling 41 of the robotic cell 4. This will be described later by referring to FIGS. 7A and 7B.

Each hook 241 includes a ring shaped member and a bolt shaped member. The lid 24 is secured to the housing 21 by the bolt shaped member of the hook 241. This will be described later by referring to FIG. 3.

The lid 24 has an opening at the center. The opening is covered with a connector base 242. The connector base 242 collectively accommodates various connectors and associated elements that couple the wirings inside the parallel link robot 2 to external wirings. Specifically, the connector base 242 includes a connector 243 for power feeding cables, a connector 244 for control cables, a connector 245 for connection with external equipment, and a connector 246 for connection of an air tube between the end effector 25a and the suction device.

The connector base 242 is secured to the lid 24 with screws 248 via a gasket, not shown. Thus, the connector base 242 is detachable from the lid 24, and this ensures replacement and other work associated with the wirings without opening the lid 24.

The connector base 242 has an opening, which is covered by a battery base 247. The battery base 247 is attached with a battery 250 for the encoders of the motors of the motor units 22.

Figure 2B:
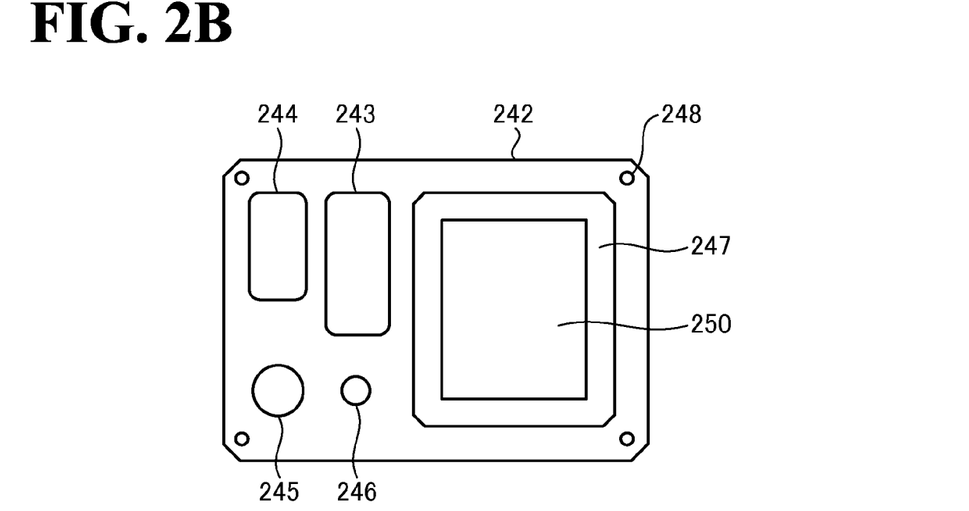
FIG. 2B is a schematic rear view of a connector base.

FIG. 2B is a schematic rear view of the connector base 242. As shown in FIG. 2B, the connector base 242 accommodates, on its rear surface, the connector 243 for power feeding cables, the connector 244 for control cables, the connector 245 for connection with external equipment, the connector 246 for air tube connection, and the battery 250 for the encoders. The battery 250 for the encoders is mounted on the connector base 242 via the battery base 247, as described above.

The battery base 247 is secured to the connector base 242 with screws 249 via a gasket, not shown. Thus, the battery base 247 is detachable from the connector base 242, and this ensures independent removal of the battery 250, which is replaced comparatively frequently.

Although not shown in the drawings, the connector 243 for power feeding cables shown in FIG. 2B is coupled with the power feeding cables of the motor units 22. The connector 244 for control cables shown in FIG. 2B is coupled with the control cables of the motor units 22. The battery 250 for the encoders shown in FIG. 2B is coupled with the encoder feeding cables of the motor units 22.

Figure 3:
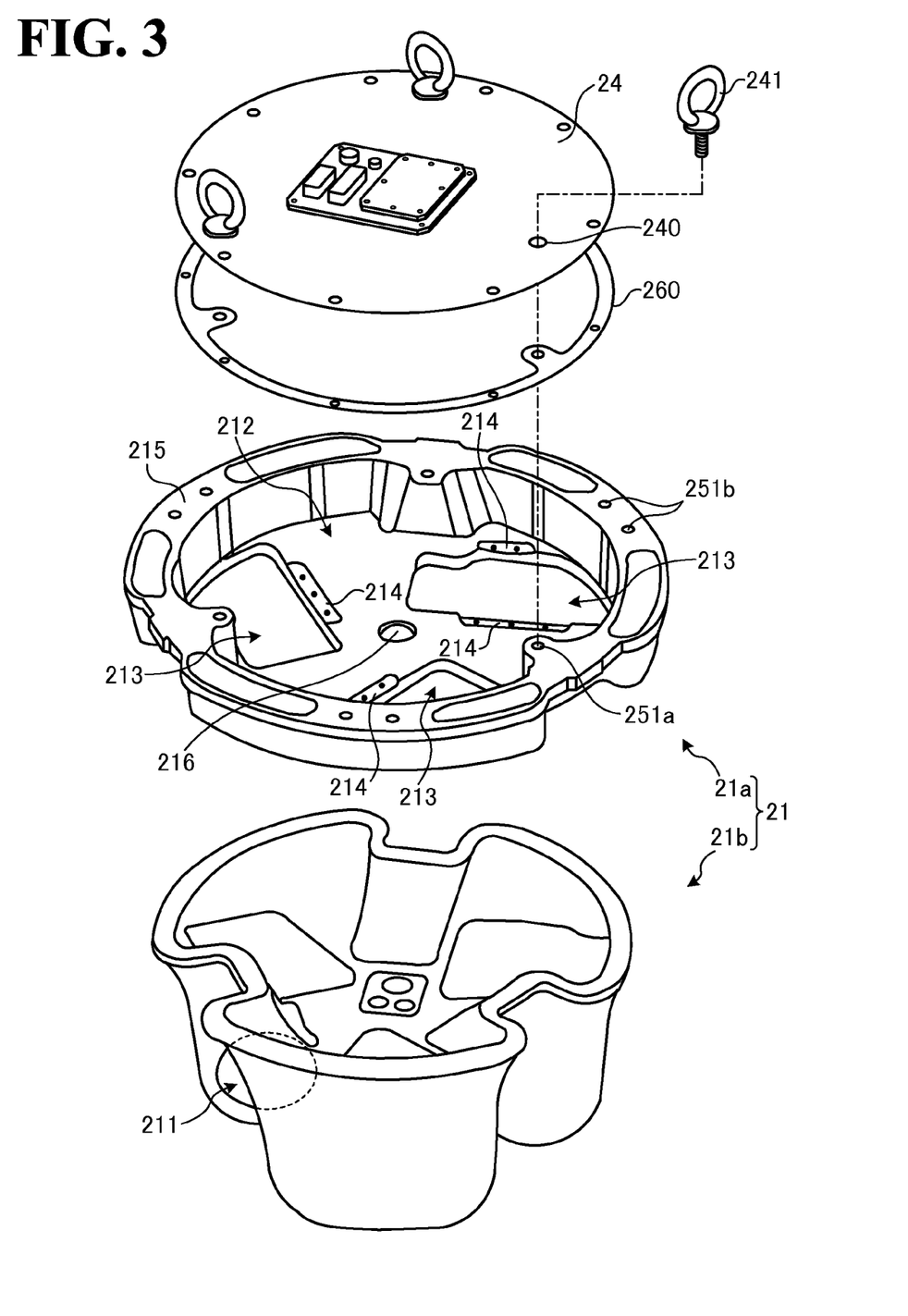
FIG. 3 is a schematic exploded perspective view of a housing.

Next, the configuration of the housing 21 will be described by referring to FIG. 3. FIG. 3 is a schematic exploded perspective view of the housing 21.

As shown in FIG. 3, the housing 21 is of a double structure of a holding portion 21a and a cover 21b. The holding portion 21a holds the motor units 22. The cover 21b has a bottom to cover the lower portions of the motor units 22 held by the holding portion 21a.

While in this embodiment the housing 21 has a double structure making the housing 21 dividable, this should not be construed in a limiting sense. The housing 21 may be integral die-casting of a single casting material or other material. In order to reduce the weight of the housing 21, the holding portion 21a, which is a structural member, may be made of metal, while the cover 21b may be made of a lighter material such as light metal and resin.

The holding portion 21a is in the form of an approximate tray with an opening on top. The holding portion 21a includes, on its bottom surface, cutouts 213 of approximately the same shapes as the outlines of the respective motor units 22. Each cutout 213 includes, on its both sides, steps 214 of slight depressions below the bottom surface of the holding portion 21a.

The holding portion 21a includes, on its bottom surface, a communication hole 216 through which a suction air tube passes. The gap between the air tube and the communication hole 216 is sealed by sealing treatment. This improves air tightness and liquid tightness inside the holding portion 21a.

The holding portion 21a includes a flange 215 at the upper end edge. The flange 215 serves as the surface at which the parallel link robot 2 is mounted on the ceiling 41. It is also at the flange 215 that the cover 21b and the lid 24 are secured to the holding portion 21a.

The flange 215 includes bolt holes 251a. The bolt holes 251a are used to secure the lid 24 to the holding portion 21a. Specifically, the lid 24 has similar bolt holes 240 to the bolt holes 251a. The bolt shaped members of the hooks 241 are inserted into the bolt holes 240 and the bolt holes 251a, securing the lid 24 to the holding portion 21a.

In order to ensure high air tightness inside the housing 21, the lid 24 is mounted on the holding portion 21a via a ring gasket 260.

The flange 215 includes bolt holes 251b at the side further outward than the bolt holes 251a. The bolt holes 251b are bolt holes through which to pass securing members (bolts 100c, described later) at the time of mounting the parallel link robot 2 on the ceiling 41 of the robotic cell 4.

The cover 21b is an approximately bowl-shaped, integral casting formed in a mold. The cover 21b is also open on top and has an upper end edge secured to the flange 215 of the holding portion 21a.

The cover 21b has a smoothly curved external surface. This makes the housing 21 resistant to contamination and facilitates cleaning. Each opening 211, which is for arm coupling, is disposed on the cover 21b.

The opening on top of the holding portion 21a will be hereinafter referred to as "receiving opening 212".

Figure 4:
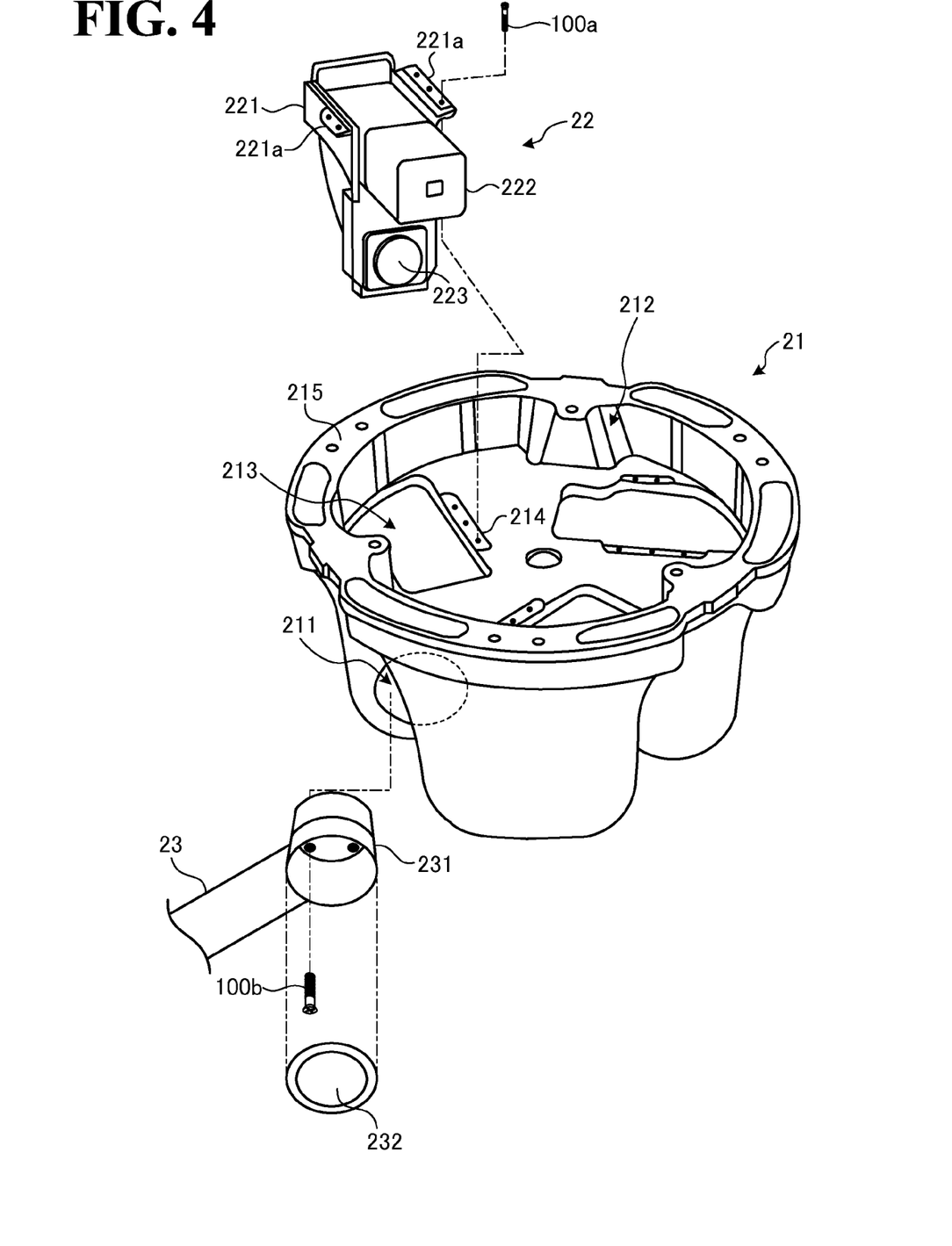
FIG. 4 is a perspective view of the housing illustrating a method for mounting a motor unit and an arm.

Next, a method for mounting the motor unit 22 and the arm 23 on the housing 21 will be described by referring to FIG. 4. FIG. 4 is a perspective view of the housing 21 illustrating a method for mounting the motor unit 22 and the arm 23.

Figure 5:
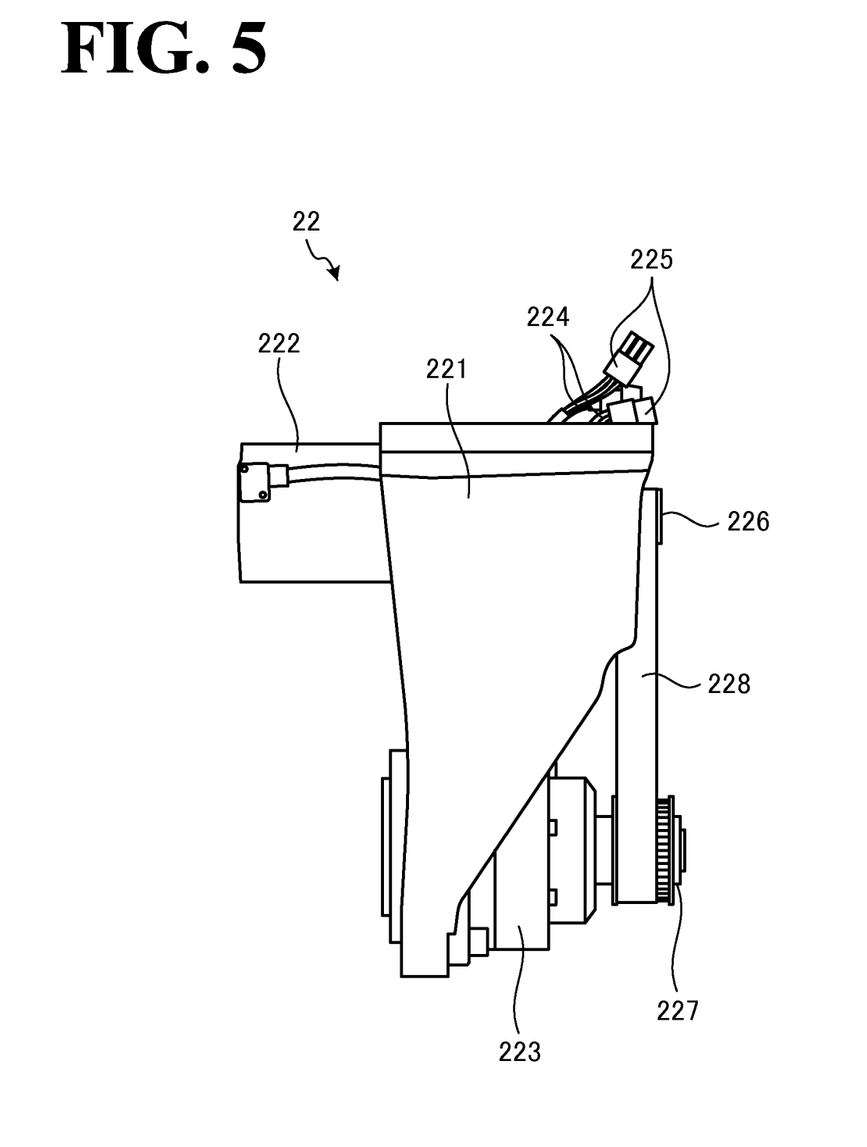
FIG. 5 is a schematic side view of the motor unit.

As shown in FIG. 4, the motor unit 22 is a reducer equipped motor unit including a casing 221, a motor 222, and a reducer 223. The motor 222 and the reducer 223 are integrally mounted on the casing 221. The configuration of the motor unit 22 will be described in detail by referring to FIG. 5. FIG. 5 is a schematic side view of the motor unit 22.

As shown in FIG. 5, the motor unit 22 includes the casing 221, the motor 222, the reducer 223, pulleys 226 and 227, and a belt 228. The motor 222 is an electric motor to drive the arm 23. The reducer 223 reduces the rotation speed of the motor 222 and outputs the resulting force to the arm 23. The pulleys 226 and 227 are respectively mounted on the shafts of the motor 222 and the reducer 223. The belt 228 is looped around the pulleys 226 and 227 so as to transmit the rotational force of the motor 222 to the reducer 223 through the pulleys 226 and 227.

The motor 222, the reducer 223, the pulleys 226 and 227, and the belt 228 are integrally mounted on the casing 221.

Referring again to FIG. 4, a method for mounting the motor unit 22 will be described. The casing 221 includes flanges 221a on top edges. The motor unit 22 is inserted into the cutout 213 of the holding portion 21a, and the flanges 221a are brought into contact with the steps 214 at both sides of the cutout 213. Thus, the motor unit 22 is held by the holding portion 21a of the housing 21.

The motor unit 22 has its flanges 221a coupled to the steps 214 with securing members such as bolts 100a. Thus, the motor unit 22 is secured to the holding portion 21a. The bolts 100a are inserted through the receiving opening 212 from a direction above the receiving opening 212.

Thus, the motor unit 22 is accommodated in the housing 21. Specifically, the motor unit 22 is held by the holding portion 21a and covered with the cover 21b. This ensures that debris, if any, accumulates on the bottom of the cover 21b. Debris includes a leakage of grease from the reducer 223 and abrasion powder from the motor 222, the belt 228, or other members. This, in turn, eliminates or minimizes the possibility of these kinds of debris dropping onto the conveyor 1 below the parallel link robot 2. Although there are the arm coupling openings 211 on the cover 21b, the arm coupling openings 211 are disposed at positions higher than the bottom of the cover 21b, as described above. This minimizes the possibility of dropping, through the openings 211, of foreign matters accumulated on the bottom of the cover 21b.

The housing 21 of the parallel link robot 2 includes the receiving opening 212, through which the motor unit 22 is attached and detached from and in a direction above the receiving opening 212. This ensures that the operator can stay in the maintenance space A2 when attaching and detaching the motor unit 22. This minimizes the possibility of dropping of the bolts 100a, grease, abrasion powder, and other foreign matters onto the conveyor 1 during maintenance of the parallel link robot 2.

Debris such as grease and abrasion powder does not scatter but, instead, accumulates mainly in the cover 21b below the motor unit 22. This ensures that debris is easily removed while the operator staying in the maintenance space A2.

The parallel link robot 2 includes the lid 24 to cover the receiving opening 212. The receiving opening 212 is thus sealed all the time except at maintenance. This eliminates or minimizes dust or other material entering the housing 21.

The arms 23 are attached and detached while the operator staying next to the housing 21, that is, staying in the workspace A1.

Specifically, each arm 23 includes, at its base end, a cylindrical coupling portion 231 open at one end. The coupling portion 231 is inserted into the housing 21 through the opening 211 of the cover 21b, and this brings the coupling portion 231 into contact with the reducer 223 of the motor unit 22 accommodated in the housing 21. The other end of the coupling portion 231, which is opposite the open one end, is in contact with the reducer 223 and covered with a surface having bolt holes.

With the coupling portion 231 in contact with the reducer 223, the coupling portion 231 and the reducer 223 are coupled to one another with securing members such as bolts 100b. Thus, the arm 23 is coupled to the motor unit 22. The open one end of the coupling portion 231 is covered with a cap member 232 after the arm 23 is coupled to the motor unit 22.

Thus, although the operator attaches the arm 23 while staying in the workspace A1, the cap member 232 is disposed at the coupling portion 231 to eliminate or minimize dropping of disconnected bolts 100b, if any, onto the conveyor 1.

Figure 6:
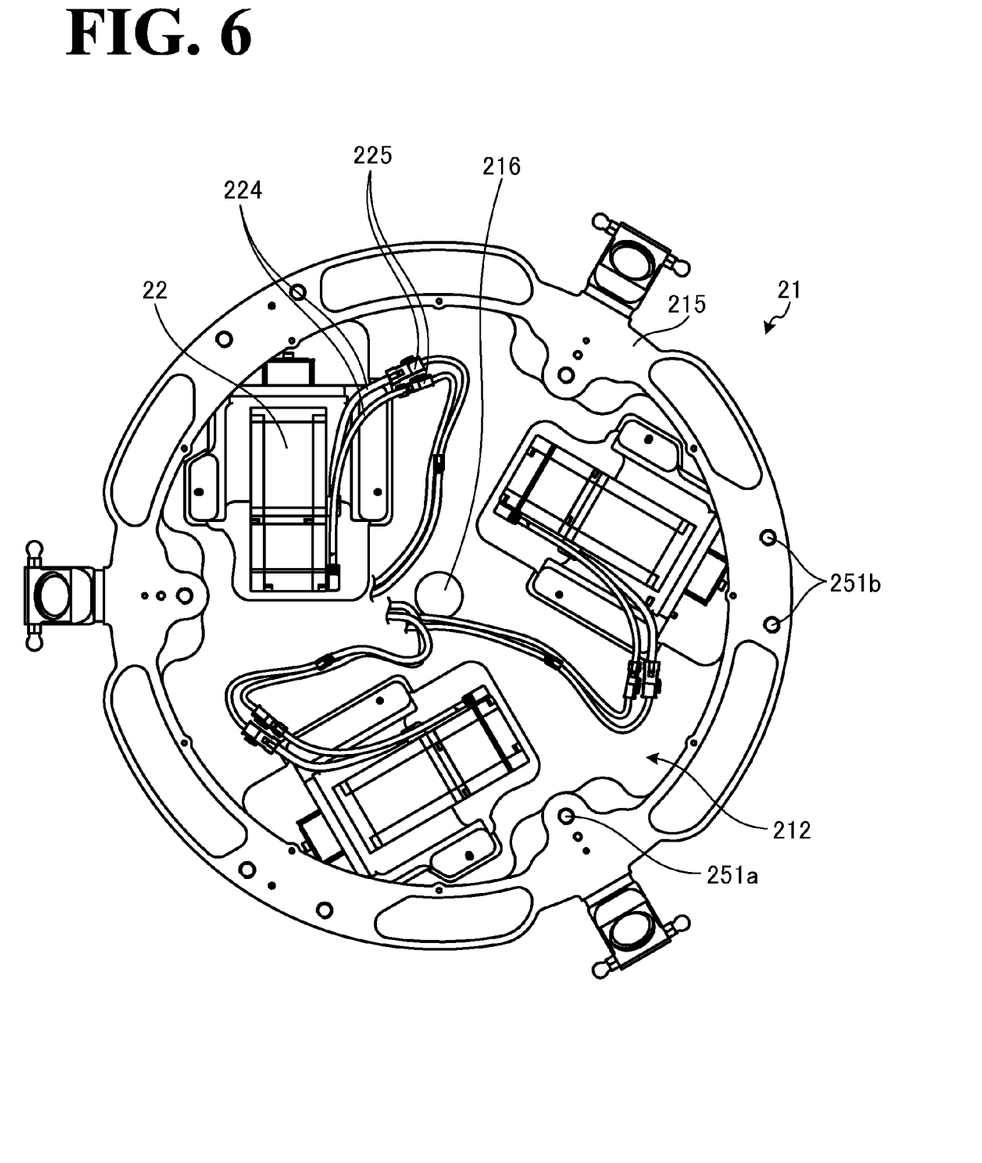
FIG. 6 is a schematic top view of the housing on which the motor unit is mounted.

Next, wiring of the motor unit 22 will be described by referring to FIG. 6. FIG. 6 is a schematic top view of the housing 21 on which the motor unit 22 is mounted.

As shown in FIG. 6, each motor unit 22 is coupled to, for example, a power feeding cable, a control cable, and an encoder power feeding cable (these cables will be hereinafter referred to as "cables 224"). The respective cables 224 are coupled to the connector 243 for power feeding cables disposed on the connector base 242, the connector 244 for control cables disposed on the connector base 242, and the battery 250 for the encoders disposed on the connector base 242.

Each cable 224 includes a relay connector 225 at a middle portion of the cable 224. The cable 224 is separatable and connectable at the relay connector 225. Although the housing 21 is coupled to the lid 24 with the cables 224, the cables 224 are separatable at their respective relay connectors 225, and this eliminates or minimizes tangling of the cables 224 when the lid 24 is open.

Figure 7A:
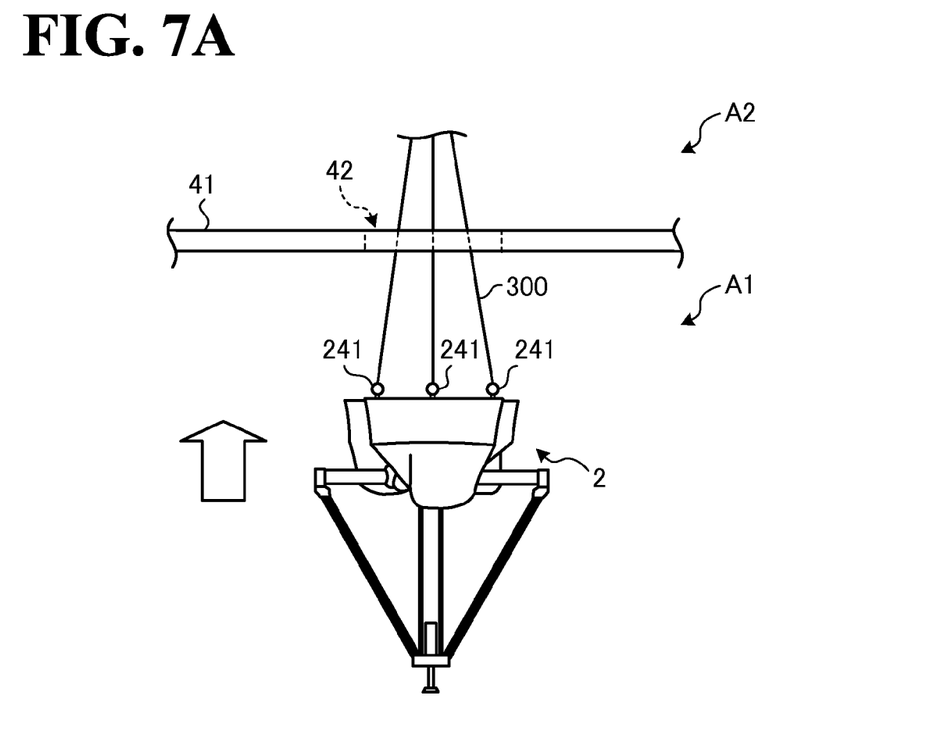
FIG. 7A is a diagram illustrating a method for mounting the parallel link robot.
Figure 7B:
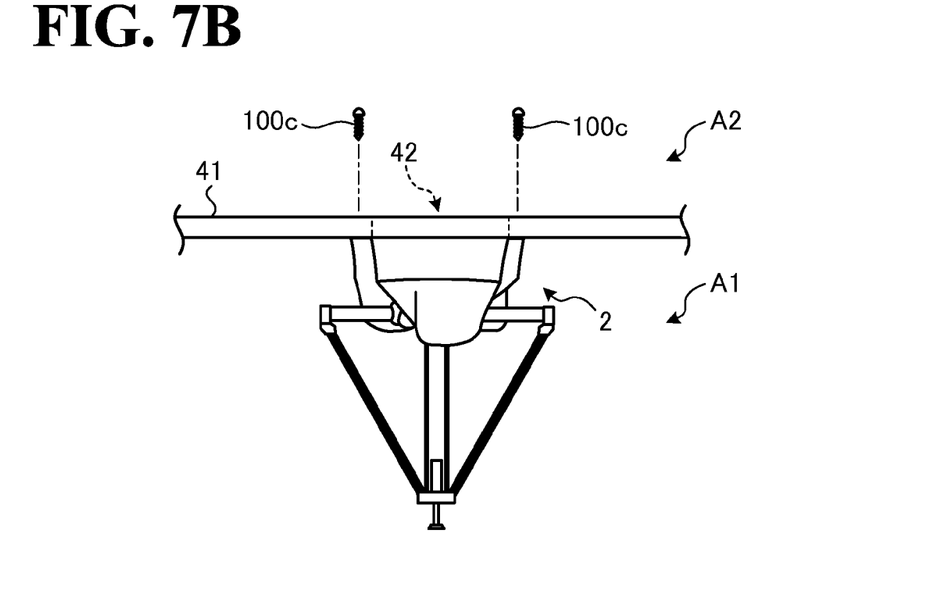
FIG. 7B is a diagram illustrating a method for mounting the parallel link robot.

Next, a method for mounting the parallel link robot 2 on the ceiling 41 will be described by referring to FIGS. 7A and 7B. FIGS. 7A and 7B are schematic front views illustrating a method for mounting the parallel link robot 2. FIG. 7A shows a step of lifting the parallel link robot 2 up to the ceiling 41. FIG. 7B shows a step of, after lifting the parallel link robot 2 up to the ceiling 41, securing the parallel link robot 2 to the ceiling 41.

As shown in FIG. 7A, wires 300 are threaded through the respective hooks 241 of the parallel link robot 2. The wires 300 extend to the maintenance space A2 through the opening 42 of the ceiling 41. Pulling the wires 300 lifts the parallel link robot 2 up to the ceiling 41.

With the parallel link robot 2 reaching the ceiling 41, the flange 215 (see FIG. 3) is in contact with the undersurface of the ceiling 41, as shown in FIG. 7B. Securing members such as bolts 100c are inserted into the ceiling 41 and the bolt holes 251b (see FIG. 3) of the flange 215. Thus, the parallel link robot 2 is secured to the ceiling 41.

As shown in FIG. 7B, the bolts 100c are inserted from a direction above the ceiling 41. This eliminates or minimizes dropping of disconnected bolts 100c, if any, in the maintenance space A2 or in the housing 21 of the parallel link robot 2. This, in turn, eliminates or minimizes dropping of disconnected bolts 100c, if any, onto the conveyor 1.

Next, a procedure for maintenance of the parallel link robot 2 will be described. Replacement of the belt 228 of the motor unit 22 will be taken as an example of maintenance.

First, the operator discontinues the parallel link robot 2. Next, in the robotic cell 4 (that is, in the workspace A1), the operator removes the bolts 100b (see FIG. 4). Thus, the arm 23 is detached off the motor unit 22.

Then on the ceiling 41 (that is, in the maintenance space A2), the operator removes the power feeding cables, the control the cables, the air tubes, and like members. The operator loosens the hooks 241 screwed to the lid 24 and opens up the lid 24. The operator then separates each cable 224 at the relay connector 225. Thus, the lid 24 is removed off the housing 21.

Next, the operator looses the bolts 100a and lifts up the motor unit 22. Then in some other workspace, the operator disassembles the motor unit 22 and replaces the used belt 228 with a new belt.

Thus, the parallel link robot 2 according to this embodiment involves a minimal process step count in the workspace A1 during maintenance such as belt replacement. This minimizes the possibility of the workspace A1 going unclean during maintenance.

In the parallel link robot 2 according to this embodiment, the motor 222, the reducer 223, the belt 228, and other members are mounted on the common casing 221. This ensures collective removal of the motor 222, the reducer 223, the belt 228, and other members, by loosening the bolts 100a. This improves work efficiency. This also ensures that meticulous work such as replacement of the belt 228 may be implemented at a separate maintenance workspace away from the robotic cell 4. This minimizes the process step count in the maintenance space A2 and improves work efficiency.

Thus, in this embodiment, the housing with arm coupling openings accommodates a plurality of motor units. The housing also includes a receiving opening through which the motor units are attachable and detachable from and in a direction above the receiving opening. This ensures hygiene during maintenance.

In this embodiment, a reducer equipped motor unit integrally including a motor and a reducer has been described as an exemplary driving device to drive the arm. This, however, should not be construed in a limiting sense. It is also possible to dispose the motor and the reducer independently.

In this embodiment, a picking system including two parallel link robots has been described as an exemplary picking system. This, however, should not be construed in a limiting sense. It is also possible to use one or more than three parallel link robots.

In this embodiment, each parallel link robot includes a suction pad as the end effector. This, however, should not be construed in a limiting sense. The parallel link robot may include any other end effector insofar the end effector is capable of capturing workpieces. For example, the parallel link robot may include a hand-shaped end effector to capture workpieces.

In this embodiment, an exemplary parallel link robot includes three arms. This, however, should not be construed as limiting the number of arms of the parallel link robot. Of course, the number of driving devices to drive the arms increases or decreases to correspond to the number of the arms.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A parallel link robot comprising:
a housing comprising arm coupling openings, a receiving opening, and a flange extending around the receiving opening;
a plurality of driving devices disposed in the receiving opening of the housing, the plurality of driving devices being attachable and detachable from and in a direction above the receiving opening;
a flat lid covering the receiving opening; and
a plurality of arms coupled to the respective driving devices through the respective arm coupling openings,
the housing is disposed on a ceiling comprising an opening such that the driving devices are attachable and detachable through the opening of the ceiling and the receiving opening of the housing while the housing remains disposed on the ceiling, and the flange of the housing is configured to contact an undersurface of the ceiling such that the lid does not extend above the opening of the ceiling.

2. The parallel link robot according to claim 1, further comprising a securing member securing the driving devices to the housing, the securing member passing through the receiving opening from the direction above the receiving opening.

3. The parallel link robot according to claim 2, wherein the plurality of driving devices each comprise a reducer equipped motor unit integrally comprising a motor and a reducer.

4. The parallel link robot according to claim 1, wherein the plurality of driving devices each comprise a reducer equipped motor unit integrally comprising a motor and a reducer.

5. The parallel link robot according to claim 1, wherein the plurality of driving devices each comprise a reducer equipped motor unit integrally comprising a motor and a reducer.

6. The parallel link robot according to claim 1, further comprising a connector base,
wherein the lid has an opening at a center thereof, the opening of the lid is covered with the connector base to accommodate connectors for coupling wirings within the housing to external wirings.

7. The parallel link robot according to claim 6, wherein the connector base is detachable from the lid to facilitate replacement of the wirings without opening the lid.

8. The parallel link robot according to claim 1, wherein the flange is configured to directly mount the parallel link robot to the ceiling with the opening of the housing aligned with the opening of the ceiling.

9. The parallel link robot according to claim 1, wherein the flange continuously surrounds the receiving opening.

10. The parallel link robot according to claim 1, wherein an upper end of the receiving opening is aligned with the flange.

11. The parallel link robot according to claim 1, wherein the housing includes cutouts to accommodate the driving devices, the cutouts including steps on opposite sides of each respective cutout to couple the driving devices to the housing.

12. The parallel link robot according to claim 1, wherein the lid is substantially flush with an uppermost surface of the flange.

13. A picking system comprising:
a robotic cell comprising a ceiling comprising an opening; and
a parallel link robot on the ceiling of the robotic cell to cover the opening of the ceiling, the parallel link robot comprising:
a housing comprising arm coupling openings, a receiving opening, and a flange extending around the receiving opening;
a plurality of driving devices disposed in the receiving opening of the housing, the plurality of driving devices being attachable and detachable from and in a direction above the receiving opening through the opening of the ceiling;
a flat lid covering the receiving opening; and
a plurality of arms coupled to the respective driving devices through the respective arm coupling openings,
the housing is disposed on the opening of the ceiling such that the driving devices are attachable and detachable through the opening of the ceiling and the receiving opening of the housing while the housing remains disposed on the ceiling, and the flange of the housing contacts an undersurface of the ceiling such that the lid does not extend above the opening of the ceiling.

14. The parallel link robot according to claim 13, wherein the plurality of driving devices each comprise a reducer equipped motor unit integrally comprising a motor and a reducer.

15. The picking system according to claim 13, further comprising:
a connector base,
wherein the lid has an opening at a center thereof, the opening of the lid is covered with the connector base to accommodate connectors for coupling wirings within the housing to external wirings.

16. The picking system according to claim 13, wherein the connector base is detachable from the lid to facilitate replacement of the wirings without opening the lid.

17. The picking system according to claim 13, wherein the robotic cell encloses the parallel link robot.

18. The picking system according to claim 13, wherein the parallel link robot is directly mounted to the ceiling with the opening of the housing aligned with the opening of the ceiling.

19. The picking system according to claim 13, wherein the flange continuously surrounds the receiving opening.

20. The picking system according to claim 13, wherein an upper end of the receiving opening is aligned with the flange.

21. The picking system according to claim 13, wherein the housing includes cutouts to accommodate the driving devices, the cutouts including steps on opposite sides of each respective cutout to couple the driving devices to the housing.

22. The picking system according to claim 13, further comprising a controller,
wherein the controller and the parallel link robot are disposed on opposing sides of the ceiling.

23. The picking system according to claim 13, wherein the lid is substantially flush with an uppermost surface of the flange.

* * * * *